(12) United States Patent
Koistinen et al.

(10) Patent No.: US 6,308,063 B1
(45) Date of Patent: Oct. 23, 2001

(54) MOBILE COMMUNICATIONS SYSTEM AND A TRANSCODER UNIT

(75) Inventors: Tommi Koistinen, Espoo; Jyri Suvanen, Helsinki, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/548,316

(22) Filed: Apr. 13, 2000

Related U.S. Application Data

(63) Continuation of application No. PCT/FI98/00807, filed on Oct. 16, 1998.

(30) Foreign Application Priority Data

Oct. 16, 1997 (FI) ......................................... 973975

(51) Int. Cl.[7] ........................................... H04Q 7/30
(52) U.S. Cl. ........................... 455/422; 455/560; 370/353
(58) Field of Search .................... 455/517, 422, 455/560, 561, 550, 577, 68, 69, 70, 552, 553, 62, 63; 370/352, 353, 354

(56) References Cited

U.S. PATENT DOCUMENTS 6,108,560 * 8/2000 Navaro et al. ................... 455/560

FOREIGN PATENT DOCUMENTS

WO 95/21492 8/1995 (WO) .
WO 97/28664 8/1997 (WO) .
WO 97/37466 10/1997 (WO) .

OTHER PUBLICATIONS

International Search Report for PCT/FI98/00807.

* cited by examiner

*Primary Examiner*—Lester G. Kincaid
(74) *Attorney, Agent, or Firm*—Altera Law Group, LLC

(57) ABSTRACT

In a mobile speech communication system including a base station having a data connection to a mobile services switching center through a transcoder unit, where the data connection includes a circuit-switched data transmission connection between the base station and transcoder unit to exchange speech parameters transmitted as TRAU frames, the data connection also being partly composed of a packet-switched data transmission connection to improve the data transmission connection, a converter is arranged on the data transmission connection between the base station and the transcoder unit for converting a TRAU frame received from the circuit-switched data transmission connection into a packet to be transmitted over the packet-switched connection, wherein the conversion includes a removal of bits included in the TRAU frame which are not needed on the packet-switched connection. The converter also for converting a packet received from the packet-switched connection into a TRAU frame to be transmitted over the circuit-switched connection, wherein the conversion includes at least the addition of synchronization bits to the TRAU frame.

10 Claims, 4 Drawing Sheets

16 kbit/s TRAU FRAME

| OCTET | BIT 1 | BIT 2 | BIT 3 | BIT 4 | BIT 5 | BIT 6 | BIT 7 | BIT 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | D1 | D2 | D3 | D4 | D5 | D6 | D7 |
| 5 | D8 | D9 | D10 | D11 | D12 | D13 | D14 | D15 |
| . | . | | | | | | | |
| . | . | | | | | | | |
| . | . | | | | | | | |
| 36 | 1 | D241 | D242 | D243 | D244 | D245 | D246 | D247 |
| 37 | D248 | D249 | D250 | D251 | D252 | D253 | D254 | D255 |
| 38 | 1 | D256 | D257 | D258 | D259 | D260 | C16 | C17 |
| 39 | C18 | C19 | C20 | C21 | T1 | T2 | T3 | T4 |

FIG. 2

| OCTET | BIT 1 | BIT 2 | BIT 3 | BIT 4 | BIT 5 | BIT 6 | BIT 7 | BIT 8 |
|---|---|---|---|---|---|---|---|---|
| 0 | D1 | D2 | D3 | D4 | D5 | D6 | D7 | D8 |
| 1 | D9 | D10 | D11 | D12 | D13 | D14 | D15 | D16 |
| . | . | | | | | | | |
| . | . | | | | | | | |
| . | . | | | | | | | |
| 31 | D249 | D250 | D251 | D252 | D253 | D254 | D255 | D256 |
| 32 | D257 | D258 | D259 | D260 | C1 | C2 | C3 | C4 |
| 33 | C5 | C6 | C7 | C8 | C9 | C10 | C11 | C12 |
| 34 | C13 | C14 | C15 | C17 | DS1 | S1 | S2 | S3 |

FIG. 3

8 kbit/s TRAU FRAME

| OCTET | BIT 1 | BIT 2 | BIT 3 | BIT 4 | BIT 5 | BIT 6 | BIT 7 | BIT 8 |
|---|---|---|---|---|---|---|---|---|
| 0 | 0 | 0 | 0 | 0 | 0 | 0 | 0 | 0 |
| 2 | 1 | C1h | C2h | C3h | C4h | C5h | XC1 | XC2 |
| 3 | 0 | 1 | XC3 | XC4 | XC5 | XC6 | D1h | D2h |
| 4 | 1 | D3h | D4h | D5h | D6h | D7h | D8h | D9h |
| 5 | 1 | D10h | D11h | D12h | D13h | D14h | D15h | D16h |
| . | . |  |  |  |  |  |  |  |
| . | . |  |  |  |  |  |  |  |
| . | . |  |  |  |  |  |  |  |
| 9 | 1 | CRC2 | CRC1 | CRC0 | D45h | D46h | D47h | D48h |
| 11 | 1 | D49h | D50h | D51h | D52h | D53h | D54h | D55h |
| . | . |  |  |  |  |  |  |  |
| . | . |  |  |  |  |  |  |  |
| . | . |  |  |  |  |  |  |  |
| 18 | 1 | D105h | D106h | D107h | D108h | D109h | D110h | D111h |
| 19 | 1 | D112h | C6h | C7h | C8h | C9h | T1 | T2 |

FIG. 4

| OCTET | BIT 1 | BIT 2 | BIT 3 | BIT 4 | BIT 5 | BIT 6 | BIT 7 | BIT 8 |
|---|---|---|---|---|---|---|---|---|
| 0 | D1h | D2h | D3h | D4h | D5h | D6h | D7h | D8h |
| 1 | D9h | D10h | D11h | D12h | D13h | D14h | D15h | D16h |
| . | . |  |  |  |  |  |  |  |
| . | . |  |  |  |  |  |  |  |
| . | . |  |  |  |  |  |  |  |
| 13 | D102h | D103h | D104h | D105h | D106h | D107h | D108h | D109h |
| 14 | D110h | D111h | D112h | C1h | C2h | C3h | C4h | C5h |
| 15 | XC1 | XC2 | XC3 | XC4 | XC5 | XC6 | TAC | C6h |
| 16 | C7h | C8h | C9h | DS1 | S1 | S2 | S3 | S4 |

FIG. 5

MOBILE COMMUNICATIONS SYSTEM AND A TRANSCODER UNIT

CROSS REFERENCES TO RELATED APPLICATIONS

This is a continuation of International Application PCT/FI98/00807, filed Oct. 16, 1998.

FIELD OF THE INVENTION

The present invention relates to a mobile communication system which comprises a base station having a data transmission connection to a mobile services switching centre through a transcoder unit, in which system: the base station comprises means for transmitting and, correspondingly, receiving speech parameters over a radio connection from a mobile station located within its radio coverage area, the transcoder unit comprises means for decoding the speech parameters it has received from the base station to speech signals to be transmitted to the mobile services switching centre and, correspondingly, for encoding the speech signals it has received from the mobile services switching centre to speech parameters to be transmitted to the base station, and the base station and the transcoder unit communicate with one another over a circuit-switched data transmission connection, on which data transmission connection the speech parameters are transmitted by TRAU frames. Furthermore, the invention relates to a mobile communication system which comprises a base station having a data transmission connection to a mobile services switching centre through a transcoder unit, in which system: the base station comprises means for transmitting and, correspondingly, receiving speech parameters over a radio connection from a mobile station located within its radio coverage area, the transcoder unit comprises means for decoding the speech parameters it has received from the base station to speech signals to be transmitted to the mobile services switching centre and, correspondingly, for encoding the speech signals it has received from the mobile services switching centre to speech parameters to be transmitted to the base station, and the base station and the transcoder unit communicate with one another over a circuit-switched data transmission connection, on which data transmission connection the speech parameters are transmitted by TRAU frames. Furthermore, the invention also relates to a transcoder unit comprising a transcoder which includes: decoding means for decoding speech parameters the transcoder unit has received from a first data transmission connection and for forwarding them as speech signals over a second data transmission connection, and encoding means for encoding speech signals the transcoder unit has received from the second data transmission connection and forwarding them as speech parameters over the first data transmission connection. Furthermore, the invention also relates to a converter means in a mobile communication system.

The present invention particularly relates to a data transmission connection between a mobile services switching centre and a base station system of the GSM mobile communication system (Global System for Mobile Communications). However, it should be noted that although in the following, the invention will be described with reference to the GSM system in particular, the invention can also be applied to other mobile communication systems.

The GSM system includes a digital radio path, whereby a frequency spectrum required is dependent on a data transmission rate used on the radio path. The higher the data transmission rate used on the radio path, the wider the radio spectrum needed. Consequently, speech coding used in a fixed PSTN/ISDN network (Public Switched Telephone Network/Integrated Services Digital Network), transmitting 64 kbit/s of digital coded data for each traffic channel, is not suitable for use in the radio path of the GSM system. Instead of the speech coding used in the fixed network, the radio path of the GSM system therefore uses RPE-LTP speech coding (Regular Pulse Exitation—Long Term Prediction).

In order to transmit data associated with a speech channel from the base station system to the mobile services switching centre, a transcoder unit is arranged between the base station system and the mobile services switching centre in the GSM system. Speech coding and rate adaptation operations required are concentratedly arranged in a transcoder unit TRCU (Transcoder/Rate Adaptor Unit) in the GSM system. On grounds of the GSM specifications, the transcoder unit having a 64 kbit/s interface towards the mobile services switching centre and 8 or 16 kbit/s interfaces towards the base station system may be located in several alternative locations, the choice of the location being up to the system manufacturer.

DESCRIPTION OF RELATED ART

In prior art GSM mobile communication systems, information between the base station system and the transcoder unit is transmitted in TRAU frames which are transmitted between the base station system and the transcoder unit over circuit-switched 2 Mbit/s PCM connections (Pulse Code Modulation). A disadvantage associated with prior art mobile communication systems of the above-described type is that the TRAU frames utilized therein contain a large number of bits which are actually unnecessary for speech transmission. Consequently, it has been necessary to reserve more capacity for the telecommunication connection between the base station system and the transcoder unit than actually required by efficient speech transmission.

Another disadvantage associated with the transmission capacity of mobile communication systems of the above-described type is that the base station system reserves a channel from the PCM connection to be used by the mobile station for the transmission of the TRAU frame whether or not there is speech included in the TRAU frame. In other words, in connection with discontinuous transmission DTX, for example, this leads to a situation in which a major portion of the PCM channel is unnecessarily reserved for a particular mobile station, since there is no speech information to be transmitted.

SUMMARY OF THE INVENTION

An object of the present invention is to eliminate the above-described disadvantages and to provide a mobile communication system having more efficient data transmission between a base station system and a transcoder unit. This objective is achieved by the mobile communication system of the invention, which is characterized in that the data transmission connection between the base station and the transcoder unit is partly composed of a packet-switched data transmission connection, and that a converter means is arranged on the data transmission connection between the base station and the transcoder unit, the converter means comprising means for converting a TRAU frame received from said circuit-switched data transmission connection into a packet which is to be transmitted over the packet-switched connection, said conversion including the removal of bits which are included in the TRAU frame and not needed on the packet-switched connection.

An embodiment of the mobile communication system of the invention is characterized in that the data transmission connection between the base station and the transcoder unit is partly composed of a packet-switched data transmission connection, and that a converter means is arranged on the data transmission connection between the base station and the transcoder unit, the converter means comprising means for converting a packet received from said packet-switched data transmission connection into a TRAU frame to be transmitted over the circuit-switched connection, said conversion including at least the addition of synchronization bits to the TRAU frame.

The invention is based on the idea that the available data transmission capacity can be more efficiently utilized by partly substituting data transmission connections that are utilized in prior art mobile communication systems between base station systems and transcoder units by packet-switched connections. Consequently, bits that are included in TRAU frames on circuit-switched connections and not needed on the packet-switched connections can be removed when the TRAU frames are converted into packets to be used on the packet-switched data transmission connection. If required, the removed bits can be regenerated at the receiving end, in case there is a need for converting the packet received from the packet-switched data transmission connection into a TRAU frame. Synchronization bits needed on the circuit-switched PCM connections, for example, can be removed/added in accordance with the invention in connection with the conversions, whereby they need not be sent over the packet-switched connection.

When the packet-switched data transmission connection is utilized, a single speech channel of the mobile communication system does not unnecessarily load the data transmission connection in question, i.e. the packet associated with the call in question is transmitted through it only when required. When a particular mobile station uses discontinuous transmission, for example, capacity is released from the packet-switched connection, whereas capacity would not be released in the same manner on the circuit-switched PCM connection, for example. Consequently, the capacity of a data channel can be distributed among a larger number of speech channels, since it can be assumed that all the speech channels do not simultaneously include packets to be transmitted. Consequently, the most significant advantage of the mobile communication system of the invention is that it enables more efficient utilization of data transmission capacity.

The invention further relates to a transcoder unit which can be utilized in the mobile communication system of the invention. The transcoder unit of the invention is characterized in that the first data transmission connection is a packet-switched data transmission connection, whereby the transcoder unit is connected to the first data transmission connection through a converter means, the converter means comprising means for converting a packet received from the packet-switched data transmission connection into a TRAU frame, said conversion including at least the addition of synchronization bits to the TRAU frame, and for transmitting said TRAU frame to the transcoder of the transcoder unit over a circuit-switched connection.

Furthermore, the invention also relates to a converter means which can be utilized in the mobile communication system of the invention. The converter means of the invention is characterized in that it comprises means for converting a TRAU frame received from a circuit-switched data transmission connection into a packet to be transmitted over a packet-switched data transmission connection, the conversion including the removal of bits which are included in the TRAU frame and not needed on the packet-switched connection, and means for converting a packet received from said packet-switched data transmission connection into a TRAU frame to be transmitted over the circuit-switched connection, said conversion including at least the addition of synchronization bits to the TRAU frame.

BRIEF DESCRIPTION OF THE DRAWINGS

The preferred embodiments of the mobile communication system of the invention are disclosed in the accompanying dependent claims 2 to 5 and 7 and 8.

In the following, the invention will be described in more detail by way of example with reference to the accompanying drawings, in which FIG. 2 illustrates the structure of a 16 kbit/s TRAU frame, FIG. 3 illustrates a first frame type used on an ATM connection, FIG. 4 illustrates the structure of an 8 kbit/s TRAU frame, FIG. 5 illustrates a second frame type used on an ATM connection.

DETAILED DESCRIPTION OF THE INVENTION

Figure 1:
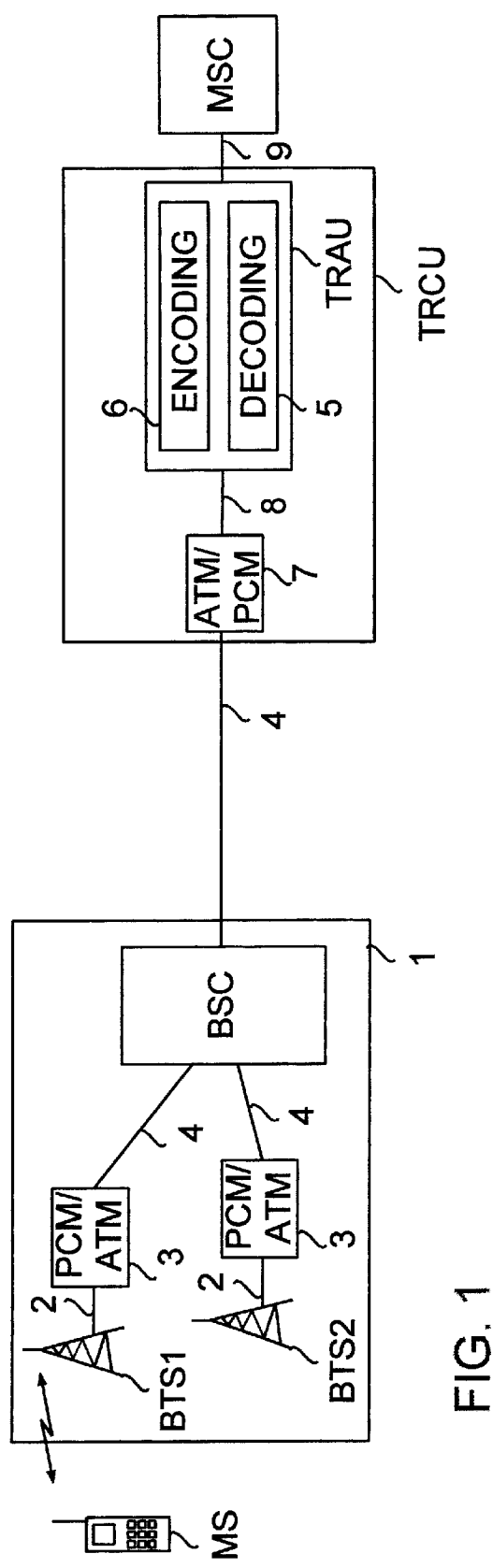
FIG. 1 shows a block diagram of a first preferred embodiment of the mobile communication system of the invention.

FIG. 1 shows a block diagram of a first preferred embodiment of the mobile communication system of the invention. The mobile communication system shown in FIG. 1 can be a GSM system or a DCS system (Digital Cellular System), for example.

In the case of FIG. 1, a mobile station MS communicates over a radio path with a base station BTS1 included in a base station system 1. The base station BTS1 therefore receives from the radio path speech parameters that are coded by RPE-LTP speech coding, and adapts them in a manner known per se to a TRAU frame and forwards them over a circuit-switched PCM connection 2 to a first converter unit 3.

The converter unit 3 converts the received TRAU frames into a packet to be transmitted over an ATM connection 4. At the same time, the converter unit 3 removes unnecessary bits included in the TRAU frame, the forwarding of which over the ATM connection 4 not being necessary. The bits to be removed include synchronization bits, for example, which are included in the TRAU frame and not needed on the ATM connection and which can, if required, be generated at the receiving end if the packet received from the ATM connection is reconverted into a TRAU frame. The two frame types used on the ATM connection 4 and the bits to be removed from the TRAU frames are described in more detail in connection with FIGS. 2 to 5.

In accordance with the invention, the first converter unit 3 further comprises means for checking, in connection with the conversion performed, the erroneousness of the TRAU frame it has received. This is done by the converter unit checking the value of an error flag of the TRAU frame. The error flag (Bad Frame Indicator) of the TRAU frame presented in FIG. 2, for example, is composed of a bit C12 as specified in section 08.60 of the GSM specifications. If the error flag shows that the TRAU frame is erroneous, the frame is not converted or forwarded. In this way, the ATM connection 4 is not unnecessarily loaded with unnecessary packets.

The above-described checking of the error flag is also useful in connection with discontinuous transmission when the mobile station MS does not transmit all the bursts over the radio path. In that case, the base station BTS1 does not receive the speech parameters from the radio path but generates and forwards the TRAU frames indicated erroneous by the error flag over the PCM connection 2. However, the first converter unit 3 detects that the TRAU frames are erroneous and prevents them from being forwarded, whereby the ATM connection 4 is not unnecessarily loaded.

Having converted the received TRAU frame into a packet to be transmitted over the ATM connection 4, the first converter unit 3 transmits the packet through a base station controller BSC to a transcoder unit TRCU (Transcoder/Rate Adaptor Unit). FIG. 1 shows one transcoder TRAU present in the transcoder unit TRCU, the transcoder including an encoder 6 and a decoder 5, although the transcoder unit in fact includes a transcoder TRAU for every simultaneous speech channel. The decoder 5 of the transcoder TRAU decodes in the manner known per se the speech parameters it has received, whereupon the transcoder unit TRCU forwards speech signals to the mobile services switching centre MSC over a circuit-switched PCM connection 9.

In the case of FIG. 1, the transcoder unit TRCU is connected to the ATM connection 4 through a second converter unit 7 which is integrated into the transcoder unit TRCU. The second converter unit 7 converts the packet it has received from the ATM connection into a TRAU frame to be transmitted to the transcoder TRAU over a circuit-switched PCM connection 8. In the conversion, the bits that were excluded from the ATM packet by the converter unit 3 are then regenerated and added to the TRAU frame formed. Such bits to be regenerated include, for example, synchronization bits by means of which the transcoder TRAU is able to synchronize with the TRAU frame transmitted by the second converter unit 7. Consequently, applying the invention does not require modifications to the transcoder TRAU, but it may be formed of a transcoder known per se, for the transcoder does not detect the existence of the ATM connection. In contrast, as distinct from the case in FIG. 1, if a transcoder is used which is able to directly process the speech parameters in the ATM packet, then the second converter unit is not required.

The most significant advantage is achieved in connection with the embodiment of FIG. 1 when the transcoder unit TRCU is located in close proximity to the mobile services switching centre MSC and, correspondingly, when the first converter unit 2 is located in close proximity to the base station BTS. In that case, the ATM connection is physically as its longest, i.e. the greatest part of the data transmission connection between the base station system and the mobile services switching centre MSC is formed of the packet-switched data transmission connection 4.

As distinct from the case in FIG. 1, the mobile services switching centre of the mobile communication system of FIG. 1 may also directly route a call from the base station BTS1 to a base station BTS2 through the converter units 3 and the base station controller BSC. In that case, the converter unit 3 connected to the base station BTS1 converts the TRAU frames received from the base station BTS1 into packets to be transmitted over the ATM connection 4, the packets being directly conveyed through the base station controller BSC to the converter unit 3 which is connected to the base station BTS2. The latter converter unit 3 converts the packet it has received from the ATM connection 4 into a TRAU frame to be transmitted to the base station BTS2 over the circuit-switched PCM connection 2. In the conversion, the bits excluded from the ATM packets by the first converter unit 3 are then regenerated and added to the TRAU frame formed. Consequently, it is possible to generate a connection not requiring a transcoder unit between the mobile stations that are located within the radio coverage area of the base stations BTS1 and BTS2, respectively.

FIG. 2 illustrates the structure of a 16 kbit/s TRAU frame. The structure of the speech frame of FIG. 2 is specified in section 08.60 of the GSM specifications. Bits D1–D260 in octets 4–38 are used for transmitting the actual speech parameters. The bits in the first two octets are coded "0". The bits in question and the first bits (coded "1") in octets 2, 4, 6 . . . 36 and 38 are synchronization bits. In accordance with the invention, the bits in question are not transmitted over the ATM connection, since they are not needed on that connection. The last four bits T1 to T4 (stop bits) and spare bits C18–C21 of the TRAU frame in question are not transmitted over the ATM connection either. Furthermore, a flag, i.e. a bit C16, used in the TRAU frame for indicating speech is not transmitted to the ATM connection, because its value can be detected at the receiving end on the basis of the value of a silence descriptor SID flag C13–C14. In FIG. 2, the bits that are transmitted over the ATM connection in accordance with the invention are shown in bold text, and the bits that are excluded are shown in normal text.

FIG. 3 illustrates a first frame type which is used on the ATM connection and, on that connection, substitutes in accordance with the invention the TRAU frame presented in FIG. 2. The frame of FIG. 3 can be used in the uplink (from base station system towards mobile services switching centre) and in the downlink (from mobile services switching centre towards base station system) directions.

In the frame of FIG. 3, bits D1–D260 are used for transmitting speech parameters. Bits C1–C5 indicate the frame type. Bits C6–C11 are timing bits. A bit C12 is used for bad frame indication BFI. Bits C13 and C14 form a SID flag. A bit C15 forms a TAF flag. A bit C17 is used in the uplink direction for controlling discontinuous transmission of the downlink direction. The bit in question is a spare bit in the downlink direction. A bit DS1 is used for indicating if the frame in question originates from the transcoder unit or from the base station system. Bits S1–S3 are spare bits.

FIG. 4 illustrates the structure of an 8 kbit/s TRAU frame. In the submultiplexed 8 kbit/s speech frame of FIG. 4, the bits that are transmitted in accordance with the invention over the ATM connection are shown in bold text. It can be detected from FIG. 4 that the bits to be excluded include synchronization bits, for example.

FIG. 5 illustrates a second frame type which is used on the ATM connection and, on that connection, substitutes in accordance with the invention the TRAU frame of FIG. 4. CRC bits CRC2–CRC0 are transmitted in their normal places between bits D44$h$ and D45$h$.

Figure 6:
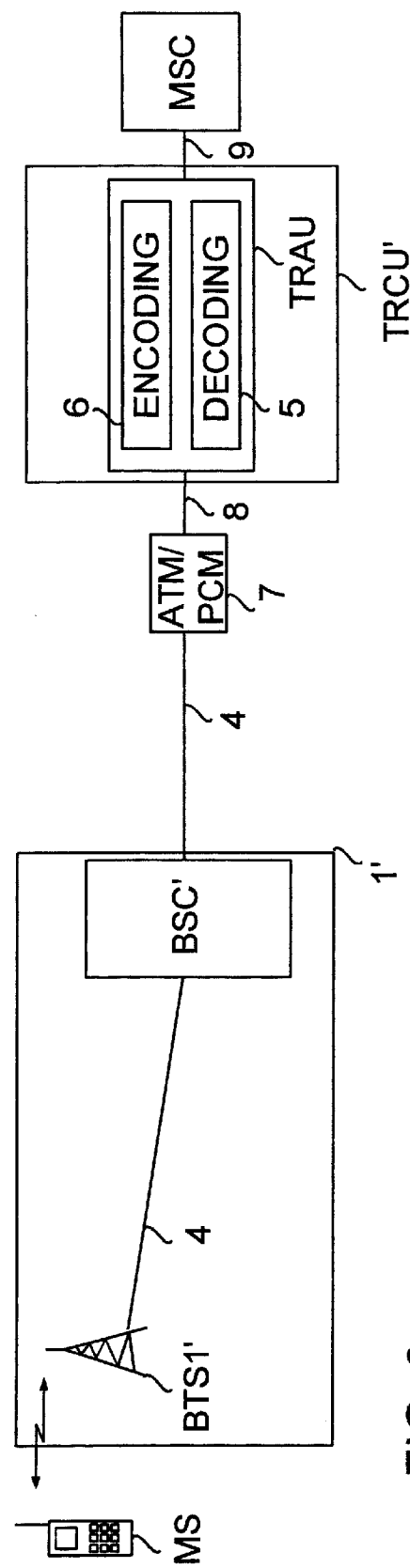
FIG. 6 shows a block diagram of a second preferred embodiment of the mobile telephone system of the invention.

FIG. 6 shows a block diagram of a second preferred embodiment of the mobile telephone system of the invention. The mobile communication system of FIG. 6 is similar to the mobile communication system of FIG. 1 in other respects except that in the case of FIG. 6 a base station BTS1' does not generate a TRAU frame, but, on the contrary, directly generates a packet from the speech parameters received from the radio path, which packet is to be transmitted over the ATM connection 4. It transmits the packet in question to the converter unit 7 through a base station controller BSC'. The converter unit 7 converts the received ATM packet into a TRAU frame, generates the synchronizing bits needed in the TRAU frame and supplies the frame over the circuit-switched PCM connection 8 to a transcoder unit TRCU'. The embodiment of FIG. 6 requires that the base station BTS1' and the base station controller BSC' are able to process the ATM packets, whereas the transcoder unit TRCU' may be formed of a transcoder unit known per se.

Figure 7:
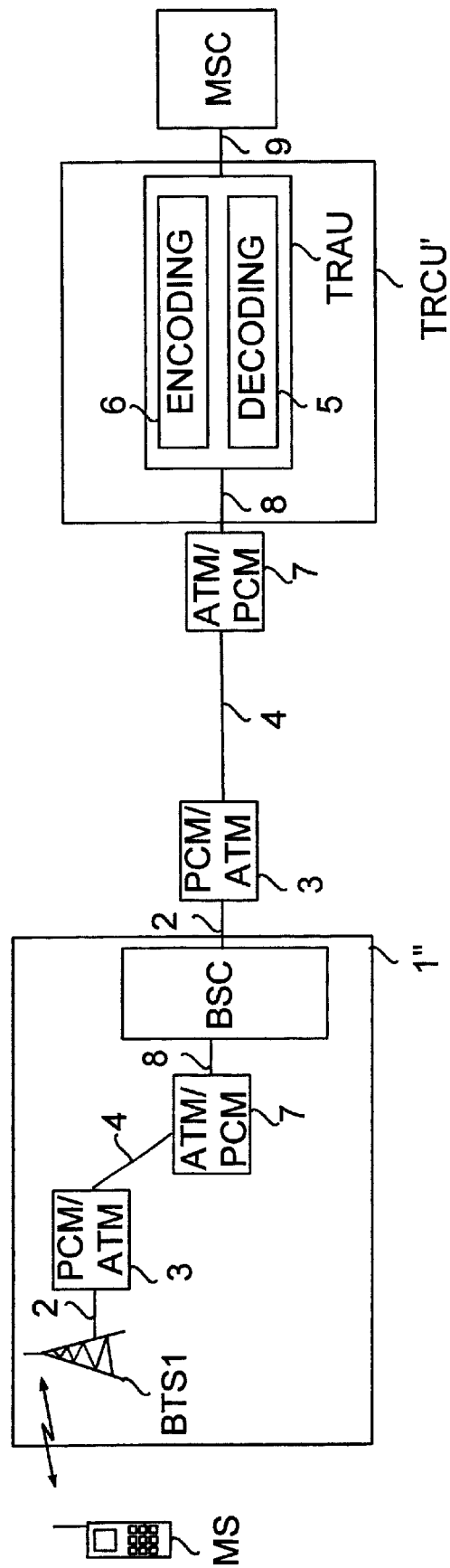
FIG. 7 shows a block diagram of a third preferred embodiment the mobile communication system of the invention.

FIG. 7 shows a block diagram of a third preferred embodiment of the mobile communication system of the invention. The embodiment of FIG. 7 differs from the previous embodiments in that the base station BTS1, the base station controller BSC and the transcoder unit TRCU' are formed of parts known per se, and the parts are connected to one another by the converter units 3 and 7 and over the ATM connections 4.

The converter units 3 thus convert the TRAU frames supplied to them by the base station BTS1 and the base station controller BSC over the circuit-switched PCM connections 2 into ATM packets, at the same time removing the unnecessary bits of the TRAU frames in connection with the conversion. Correspondingly, the converter units 7 convert the packets received from the ATM connections 4 into TRAU frames, generate and add thereto the bits that were excluded by the converter units 3, and forward the TRAU frames in question to the base station controller BSC and to the transcoder unit TRCU over the circuit-switched PCM connections 8. Consequently, in the embodiment of FIG. 8 it is possible to utilize a base station, base station controller and transcoder unit known per se, which are all commercially available and connected to one another by the ATM connections 4 and the converter units 3 and 7.

It is to be understood that the above description and the related figures are only intended to illustrate the present invention. It will be apparent to those skilled in the art that many variations and modifications can be made to the invention without departing from the scope and spirit of the invention disclosed in the attached claims.

What is claimed is:

1. A mobile communication system which comprises:
   a base station having a data transmission connection to a mobile services switching centre through a transcoder unit, wherein the base station transmits and, correspondingly, receives speech parameters over a radio connection from a mobile station located within its radio coverage area,
   the transcoder unit decodes the speech parameters it has received from the base station to speech signals to be transmitted to the mobile services switching centre and, correspondingly, for encoding the speech signals it has received from the mobile services switching centre to speech parameters to be transmitted to the base station,
   a circuit-switched data transmission connection for the base station and the transcoder unit to communicate with one another, on which data transmission connection the speech parameters are transmitted by TRAU frames, wherein
   the data transmission connection between the base station and the transcoder unit is partly composed of a packet-switched data transmission connection, and
   a converter is arranged on the data transmission connection between the base station and the transcoder unit, the converter converting a TRAU frame received from said circuit-switched data transmission connection into a packet which is to be transmitted over the packet-switched connection, said conversion including a removal of bits which are included in the TRAU frame and not needed on the packet-switched connection.

2. The mobile communication system as claimed in claim 1, wherein said circuit-switched connection is composed of a PCM connection and said packet-switched connection is composed of an ATM connection.

3. The mobile communication system as claimed in claim 1, wherein the conversion performed by a first converter means comprises at least a removal of synchronization bits that are included in the TRAU frame.

4. The mobile communication system as claimed in claim 1, wherein a first converter means is arranged to monitor an error flag of the TRAU frame the first converter has received and to interrupt the conversion and forwarding of the TRAU frame when said error flag indicates that the TRAU frame is erroneous.

5. The mobile communication system as claimed in claim 1, wherein the transcoder unit comprises means for transmitting the speech signals to the mobile services switching centre from the PCM interface in the form of PCM samples.

6. A mobile communication system which comprises:
   a base station having a data transmission connection to a mobile services switching centre through a transcoder unit, wherein the base station transmits and, correspondingly, receives speech parameters over a radio connection from a mobile station located within the base station's radio coverage area,
   the transcoder unit decodes the speech parameters it has received from the base station to speech signals to be transmitted to the mobile services switching centre and, correspondingly, for encoding the speech signals it has received from the mobile services switching centre to speech parameters to be transmitted to the base station, and
   a circuit-switched data transmission connection for the base station and the transcoder unit to communicate with one another, on which data transmission connection the speech parameters are transmitted by TRAU frames, wherein
   the data transmission connection between the base station and the transcoder unit is partly composed of a packet-switched data transmission connection, and
   a converter is arranged on the data transmission connection between the base station and the transcoder unit, the converter converting a packet received from said packet-switched data transmission connection into a TRAU frame to be transmitted over the circuit-switched connection, said conversion including at least the addition of synchronization bits to the TRAU frame.

7. The mobile communication system as claimed in claim 6, wherein said packet-switched connection is an ATM connection, and said circuit-switched connection is a PCM connection.

8. The mobile communication system as claimed in claim 6, wherein the transcoder unit transmits the speech signals to the mobile services switching centre from a PCM interface in the form of PCM samples.

9. A transcoder unit comprising:

a transcoder which includes:

decoding means for decoding speech parameters the transcoder unit has received from a first data transmission connection and for forwarding them as speech signals over a second data transmission connection, and encoding means for encoding speech signals the transcoder unit has received from the second data transmission connection and forwarding them as speech parameters over the first data transmission connection, wherein the first data transmission connection is a packet-switched data transmission connection, wherein the transcoder unit is connected to the first data transmission connection through a converter means, the converter means comprising means for converting a packet received from the packet-switched data transmission connection into a TRAU frame, said conversion including at least the addition of synchronization bits to the TRAU frame, and for transmitting said TRAU frame to the transcoder of the transcoder unit over a circuit-switched connection.

10. A converter means of a mobile communication system, wherein the converter means comprises:

means for converting a TRAU frame received from a circuit-switched data transmission connection into a packet to be transmitted over a packet-switched data transmission connection, the conversion including the removal of bits which are included in the TRAU frame and not needed on the packet-switched connection, and means for converting a packet received from said packet-switched data transmission connection into a TRAU frame to be transmitted over the circuit-switched connection, said conversion including at least the addition of synchronization bits to the TRAU frame.

* * * * *